US008127351B2

(12) United States Patent
Takagi et al.

(10) Patent No.: US 8,127,351 B2
(45) Date of Patent: Feb. 28, 2012

(54) PROGRAM EXECUTION CONTROL APPARATUS AND PROGRAM EXECUTION CONTROL METHOD

(75) Inventors: Shigeya Takagi, Osaka (JP); Hidetaka Matsumoto, Osaka (JP)

(73) Assignee: Panasonic Corporation, Osaka (JP)

( * ) Notice: Subject to any disclaimer, the term of this patent is extended or adjusted under 35 U.S.C. 154(b) by 1474 days.

(21) Appl. No.: 11/596,710

(22) PCT Filed: May 13, 2005

(86) PCT No.: PCT/JP2005/008779
§ 371 (c)(1),
(2), (4) Date: Nov. 16, 2006

(87) PCT Pub. No.: WO2005/114353
PCT Pub. Date: Dec. 1, 2005

(65) Prior Publication Data
US 2007/0214366 A1    Sep. 13, 2007

(30) Foreign Application Priority Data

May 17, 2004   (JP) .................................. 2004-146395

(51) Int. Cl.
 *G06F 21/00* (2006.01)
(52) U.S. Cl. ......................................... 726/17; 713/187
(58) Field of Classification Search ........................ None
See application file for complete search history.

(56) References Cited

U.S. PATENT DOCUMENTS

| 6,260,172 | B1 | 7/2001 | Hazama | |
|---|---|---|---|---|
| 6,449,645 | B1* | 9/2002 | Nash | 709/224 |
| 7,020,772 | B2* | 3/2006 | England et al. | 713/166 |
| 2002/0099951 | A1* | 7/2002 | O'Connor | 713/200 |
| 2005/0187740 | A1* | 8/2005 | Marinescu | 703/1 |
| 2006/0225134 | A1* | 10/2006 | Conti | 726/22 |

FOREIGN PATENT DOCUMENTS

JP            9-325914        12/1997
(Continued)

OTHER PUBLICATIONS

Spansion Data Sheet "S29GLxxxN MirrorBit™ Flash Family: S29GL512N, S29GL256N, S29GL128N" Publication No. S29GLxxxN_00, Revision A, Amendment 6, Issue Date Jan. 24, 2005.

*Primary Examiner* — Gilberto Barron, Jr.
*Assistant Examiner* — David Le
(74) *Attorney, Agent, or Firm* — McDermott Will & Emery LLP

(57) ABSTRACT

A program execution control apparatus and a program execution method are provided by which even when a program is rewritten into an illegal program after the first-mentioned program is checked, execution of the rewritten illegal program can be avoided, and also, which can readily confirm that which program has been rewritten in an illegal manner at which time instant.

The program execution control apparatus of the present invention is equipped with: a flash memory 101 for storing thereinto a program; a condition detection unit 103 for detecting a check time instant for checking as to whether or not the program is illegal; an illegality check unit 104 for checking as to whether or not the illegal program is present at the check time instant; an execution control unit 105 for controlling as to whether or not the program is executed in response to the check result; and a CPU 102 for executing the program in response to a result of the execution control unit 105.

14 Claims, 11 Drawing Sheets

FOREIGN PATENT DOCUMENTS

| | | |
|---|---|---|
| JP | 11-39158 | 2/1999 |
| JP | 11-232176 | 8/1999 |
| JP | 2004-103027 | 4/2004 |
| WO | WO 02/057904 A1 | 7/2002 |

* cited by examiner

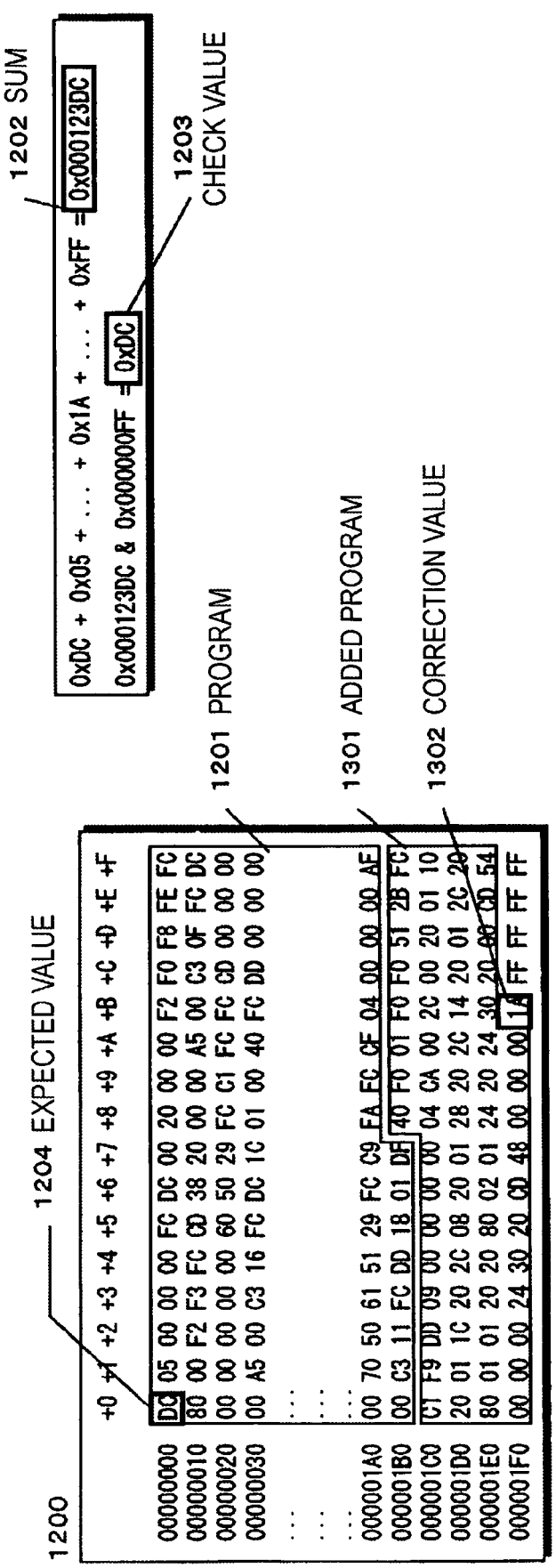

US 8,127,351 B2

PROGRAM EXECUTION CONTROL APPARATUS AND PROGRAM EXECUTION CONTROL METHOD

RELATED APPLICATIONS

This application is a national phase of PCT/JP2005/008779 filed May 13, 2005, which claims priority from Japanese Application No. 2004-146395 filed May 17, 2004, the disclosures of which Applications are incorporated by reference herein. The benefit of the filing and priority dates of the International and Japanese Applications is respectfully requested.

TECHNICAL FIELD

The present invention is related to a program execution control apparatus and a program execution control method, capable of preventing execution of an illegal program.

BACKGROUND ART

Conventionally, as methods for protecting such systems from execution of illegal and user not-intended programs, a first protection method (refer to, for example, non-patent publication 1) and a second protection method (refer to, for instance, patent publication 1, or patent publication 2) are known, while these systems contain memories capable of deleting and rewriting programs stored thereinto, and CPUs for interpreting instructions of the programs stored in the memories so as to execute the interpreted instructions. In the first method, since a rewriting operation of a memory for storing thereinto a program to be executed is protected by a predetermined method, a rewriting operation of an illegal program is prevented and the execution of the illegal program is prevented. In the second method, a program stored in a memory is checked by way of a predetermined method after a power supply of a system has been turned ON, or hardware has been reset, and then, only such a program which is judged as a normal program is executed by a CPU, so that the execution of the illegal program can be prevented.

As the first method, for instance, while the protection function is known which is installed in the flash memory S29GL512N manufactured by FASL LLC firm, a permanent protection for protecting a system from illegal rewriting operation by executing a predetermined command, a password protection for protecting a system from an illegal rewriting operation based upon a password defined by a user, and the like are known.

As the second method, the inventive idea described in the patent publication 1 is given as follows: That is, in the apparatus containing: the external ROM for storing thereinto the program used to operate the system; the built-in PROM constituted in such a manner that after the information is written thereinto, the written information cannot be deleted and rewritten; and the CPU, after the power supply of the system is turned ON, or the hardware is reset, the data of the external ROM is checked based upon the program stored in the built-in RROM. When the data of the external ROM is normal, the program of the external ROM is executed, whereas when the data of the external ROM is abnormal, the checking operation is repeatedly carried out.

Also, as the second method, the inventive idea described in the patent publication 2 is given as follows: That is, in the apparatus containing: the memory for storing the execution program which has been message-digest-processed; and the processing unit for performing the message-digest-process operation and for executing the program, after the power supply is turned ON, or the hardware is reset, the predetermined execution program is checked by way of the message digest method. When the execution program is normal, the execution program is executed, whereas when the execution program is abnormal, the execution program is stopped.

Non-patent publication 1: S29GLxxxN MirrorBit flashfamily data sheet Document No. J27631, Revised A, Ammended I, issue date: Dec. 15, 2003 (27631-AI Oct. 16, 2003), page 45 sector protect Patent publication 1: JP-A-9-325914

Patent Publication 2: JP-A-11-39158.

DISCLOSURE OF THE INVENTION

Problem that the Invention is to Solve

However, in the invention recited in the patent publications 1 and 2, the checking operation of the program stored in the memory is carried out after the power supply is turned ON, or the hardware is reset, but the checking operation is not performed at any time other than the above-explained time. In current systems with employment of OSs (Operating Systems), these systems are arranged in such a manner that a program for controlling entire programs called as the OSs is firstly executed after power supplies have been turned ON, or hardware has been reset, and thereafter, application programs operated on the OSs are executed. In the case that an illegal application program and another illegal program are stored into a memory via networks, or from storage media such as CD-ROMs after the checking operation, or in such a case that the memory is physically replaced by another memory into which an illegal program has been stored after the checking operation, the illegal program cannot be found out. As a result, the systems allow to execute such an illegal program.

Also, even if an illegal program is stored in a memory after a checking operation has been carried, since the illegal program cannot be found out, no confirmation can be made that which program has been rewritten in an illegal manner at which time instant.

The present invention has been made to solve the above-explained problems, and has an object to provide both a program execution control apparatus and a program execution control method, by which even if a program has been rewritten by an illegal program at which time instant, an execution of this illegal program can be prevented.

Also, the present invention has another object to provide a program execution control apparatus and a program execution control method, capable of readily confirming that which program has been rewritten into an illegal program at which time instant.

Means for Solving the Problems

A program execution control apparatus of the present invention is comprised of: a memory for storing thereinto a program; detection means for detecting a check time instant for checking as to whether or not the program is illegal; check means for checking as to whether or not the illegal program is present at the check time instant; control means for controlling to execute a program having no illegality, which is judged by the check means; and execution means for executing the program having no illegality.

Also, in the program execution control apparatus of the present invention, the control means controls not to execute a program having an illegality, which is judged by the check means; and the execution means does not execute the program having the illegality.

A program execution control method of the present invention is comprised of: a detection step for detecting a check time instant for checking as to whether or not a program stored in a memory is illegal; a check step for checking as to whether or not the illegal program is present at the check time instant; a control step for controlling to execute a program having no illegality, which is judged by the check step; and an execution step for executing the program having no illegality.

Also, in the program execution control method of the present invention, the control step controls not to execute a program having an illegality, which is judged by the check step; and the execution step does not execute the program having the illegality.

Since the check is made as to whether or not the illegal program is present at only the fixed time instant in the conventional technique, the illegal program cannot be found out. However, in accordance with the above-explained arrangement, since the check is performed as to whether or not the illegal program is present at the arbitrary check time instant, the illegal program can be found out without overlooking such an illegal program.

Also, in the program execution control apparatus of the present invention, the detection means detects a predetermined time instant.

Also, in the program execution control method of the present invention, the detection step detects a predetermined time instant.

In accordance with the above-explained arrangement, since the check is made as to whether or not the illegal program is present at a plurality of preset time instants, the illegal program can be effectively found out.

Also, in the program execution control apparatus of the present invention, the detection means detects a time instant when the program is rewritten.

Also, in the program execution control method of the present invention, the detection step detects a time instant when the program is rewritten.

In accordance with the above-explained arrangement, since the program is checked at all of the time instants when the program is rewritten, the illegal program can be immediately found out at such a time instant when the program is rewritten into the illegal program.

Also, in the program execution control apparatus of the present invention, the detection means detects a time instant for every predetermined time interval.

Also, in the program execution control method of the present invention, the detection step detects a time instant for every predetermined time interval.

In accordance with the above-explained arrangement, since the program is checked for every predetermined time interval, even when the program is rewritten into the illegal program, the illegal program can be effectively found out.

Also, the program execution control apparatus of the present invention is comprised of recording means for recording a check result checked by the check means.

Also, the program execution control method of the present invention is comprised of a recording step for recording a check result checked by the check step.

In accordance with the above-explained arrangement, since the check result made by the check means is recorded, it is possible to confirm that which program has been rewritten by the illegal program at which time instant.

Also, in the program execution control apparatus of the present invention, the control means controls that the program having no illegality is executed by referring to the check result recorded in the recording means.

Also, in the program execution control method of the present invention, the control step controls that the program having no illegality is executed by referring to the recorded check result.

Also, in the program execution control apparatus of the present invention, the control means controls that the program having the illegality is not executed by referring to the check result recorded in the recording means.

Also, in the program execution control method of the present invention, the control step controls that the program having the illegality is not executed by referring to the recorded check result.

In accordance with the above-described arrangement, since the program having no illegality is executed by referring to the recorded check result, there is no necessity for controlling as to whether or not the program is executed every time the check is made as to whether or not the illegal program is present. As a result, the program can be carried out in an efficient manner.

Also, the program execution control apparatus of the present invention is comprised of: judging means for judging as to whether or not the program having the illegality is executed; and the control means controls to execute the program having the illegality, which is judged to be executed.

Also, the program execution control method of the present invention is comprised of: a judging step for judging as to whether or not the program having the illegality is executed; and the control step controls to execute the program having the illegality, which is judged to be executed.

In accordance with the above-described arrangements, the program can be effectively executed by performing such a control operation as to allow execution of a program such as a program which is not influenced at all or is influenced a little by illegality even if the program is rewritten to an illegal program.

Advantage of the Invention

In accordance with the program execution control apparatus and the program execution control method of the present invention, the check is made of the presence/absence of illegality in the program at any check timing, it is possible to find out an illegal program without overlooking such an illegal program and prevent execution of the illegal program.

Also, in accordance with the program execution control apparatus and the program execution control method of the present invention, since the check result obtained by the check means is recorded, it is possible to confirm that which program has been rewritten into the illegal program of which time instant.

BRIEF DESCRIPTION OF THE DRAWINGS

FIG. 11 is a memory image diagram in which a program has been dynamically added.

DESCRIPTION OF REFERENCE NUMERALS AND SIGNS

Figure 1:
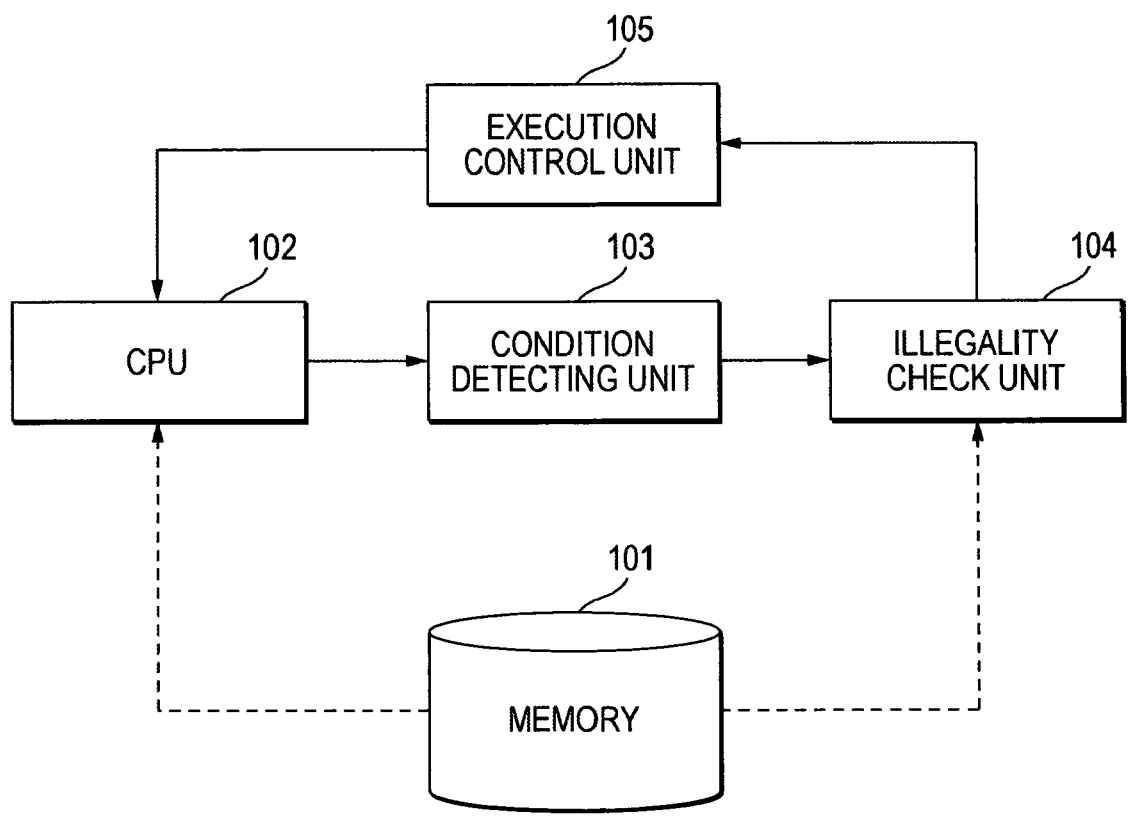
FIG. 1 is a structural diagram for showing program execution control apparatus according to first and second embodiment modes of the present invention.

101 flash memory
102 CPU
103 condition detecting unit
104 illegality check unit
105 execution control unit
301 access control unit
501 illegality recording unit
502 illegality recording memory
503 execution control unit
801 access control unit
901 rewrite control unit
1200 entire memory area
1201 program
1202 sum
1203 check value
1204 expected value
1301 added program
1302 correction value

BEST MODE FOR CARRYING OUT THE INVENTION

Embodiment modes as to a program execution control apparatus and a program execution control method of the present invention will be now described with reference to the accompanying drawings.

First Embodiment Mode

FIG. 1 is a structural diagram for showing a program execution control apparatus according to a first embodiment mode of the present invention. The program execution control apparatus is constituted by a flash memory 101 which stores therein a program to be executed, a CPU 102 which executes a program, a condition detecting unit 103 which detects that the flash memory 101 is reprogrammed by the CPU 102, an illegality check unit 104 which checks as to whether or not the program stored in the flash memory 101 is illegal when the condition detecting unit 103 detects the reprogramming, and an execution control unit 105 which controls execution of the program according to a check result obtained from the illegality check unit 104.

In this specification, a term "illegal program" corresponds to a program which can be exclusively determined by an illegality check unit according to an embodiment mode of the present invention. As is conventionally known, for example, the illegality check unit compares a value resulting from a summation of all data on the flash memory where a program to be executed is stored with a predetermined normal value, and judges such a program having the below-mentioned data as an illegal program when the summed value differs from the normal value. In the following description, the expression "illegal program" is used to have the above-explained meaning.

Referring now to memory image diagrams in FIG. 10 and FIG. 11, a check method by which the illegality check unit according to the first embodiment mode judges an illegal program will be described in detail.

Figure 10:
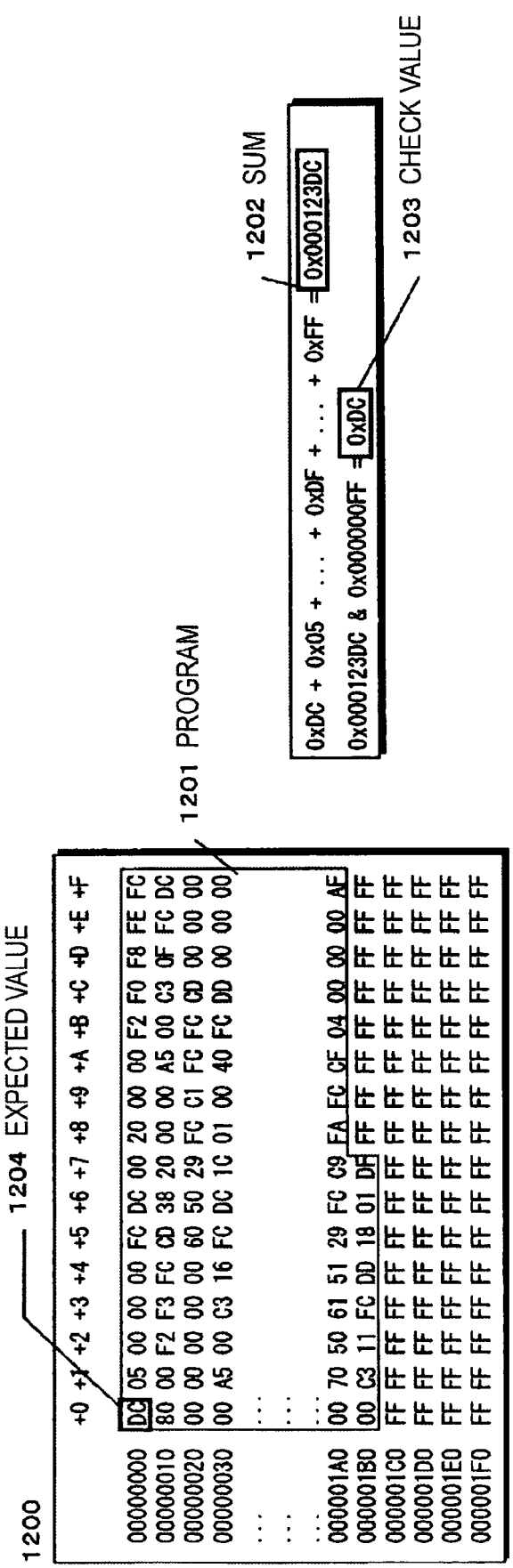
FIG. 10 is a memory image diagram in which a program has been stored.

FIG. 10 is a memory image diagram in which a program has been stored. Addresses from 0x00000000 to 0x000001FF covers an entire memory area 1200. A program 1201 is stored at addresses from 0x00000000 to 0x000001B7, and 0xFF which is an initial value of the memory is stored in an available space from addresses 0x000001B8 to 0x000001FF. In an illegality check, firstly, a sum 1202 of values over the entire area is calculated. Adding up from 0xDC at the address 0x00000000 to 0xFF at the address 0x000001FF yields 0x000123DC. Next, a check value 1203 of lower 8 bits of the sum is calculated to become 0xDC. This detected value is compared with 0xDC at the address 0x00000000 which is a predetermined 8-bit expected value 1204. In the case of the memory image in FIG. 10, the check value 1203 and the expected value 1204 are made coincident at 0xDC with each other, so that the check result is determined as a normal value.

On the other hand, FIG. 11 is a memory image diagram in which a program 1301 has been dynamically added to the memory in FIG. 10. The added program 1301 is stored in the available space starting from the address 0x000001B8. The stored area ranges from the address 0x000001B8 to the address 0x000001FB. A illegality check is executed in the same way as has been explained above referring to FIG. 10, and as the check value 1203 is made coincident with the expected value 1204 on 0xDC, the check result is determined as a normal value. The reason why it is so judged as the normal value even though a program is added is that the normal added program 1301 has a correction value 1302 to make the check value 1203 coincident with the expected value 1204. As a sum 1202 of the values over the entire area including the correction value 1302 which is 0x1A at the address 0x000001FB at the end of the added program 1301, the check value 1203 is made coincident with the expected value 1204. The end of a program which is illegally added remains 0xFF corresponding to the initial value of the memory, not equal to the correction value 1302. In the case of the illegally added program, therefore, when 0xFF is at the address 0x000001FB, the check value 1203 becomes 0xC2 different from the expected value 1204, so that the resulting program is determined as an illegal program.

Although the check method explained is limited to such a check method which compares a predetermined 8-bit expected value with a check value of lower 8 bits of the sum of the values over the entire area of the flash memory 101 and makes a decision by checking as to whether or not both values are made coincident with each other, various modified check methods may be employed without departing from the technical scope of the present invention. When the check method is installed as a program, decryption of the check method is prevented by taking measures, such as storing of the program in an unreadable memory or in a mask ROM, or implementing the program as check-specific hardware. Since the check method using the aforementioned memory image diagrams is the same in embodiment modes to be described below, the description thereof will be omitted hereunder.

Figure 2:
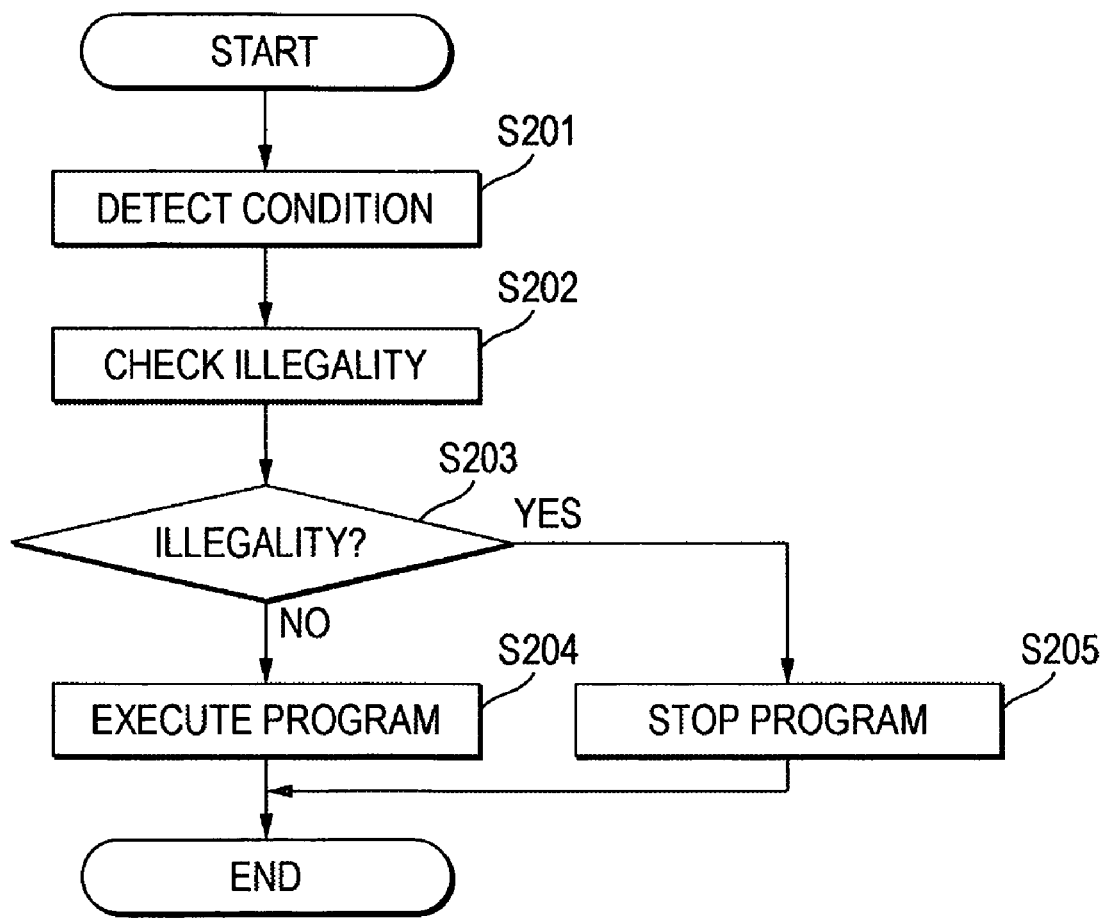
FIG. 2 is a process flow chart as to the program execution control apparatus according to the first and second embodiment modes of the present invention.

FIG. 2 is a process flow chart of the program execution control apparatus according to the first embodiment mode of the present invention. First, the condition detecting unit 103 detects that the program stored in the flash memory 101 has been rewritten by the CPU 102 (step S201). As the method for the condition detecting unit 103 to detect rewriting of the program, a rewrite command is issued to the flash memory 101 for detection of completion of the rewrite process in the first embodiment mode.

Then, the illegality check unit 104 checks as to whether or not the program rewritten in the flash memory 101 is illegal in accordance with the above-described check method (step S202).

Next, the illegality check unit 104 notifies the check result obtained in step S202 to the execution control unit 105 (step S203). When the check result is notified as the normal value in the step S203, the execution control unit 105 initiates the CPU 102 so as to execute the program (step S204). When the check result is notified as the illegal program in step S203, the execution control unit 105 performs such a control operation as stopping of the CPU 102, inhibiting of the CPU 102 from executing the program which is judged as the illegal program (step S205).

According to the program execution control apparatus and program execution control method of the first embodiment mode of the invention, as described above, every time the program stored in the flash memory is rewritten, the rewritten program is checked so as to ensure prevention of execution of an illegal program even if the program stored in the flash memory is rewritten to the above-described illegal program.

Also, timing at which the flash memory 101 is rewritten by the CPU 102 corresponds to the timing at which the program is rewritten with the entire area of the flash memory 101 being in an initial state and another program is dynamically added after the existing program has run.

Second Embodiment Mode

An arrangement of a program execution control apparatus according to a second embodiment mode is the same as the arrangement of the program execution control apparatus of the first embodiment mode shown in FIG. 1. The arrangement of the program execution control apparatus of the second embodiment mode differs from the first embodiment mode in that the condition detecting unit 103 detects an interrupt signal issued from a timer built in the CPU 102. The illegality check unit 104 and the execution control unit 105 are arranged as follows: That is, when the condition detecting unit 103 detects the interrupt signal issued from the timer, the illegality check unit 104 checks as to whether or not the program stored in the flash memory 101 is illegal. Then, the execution control unit 105 controls the execution of the program in response to the result from the illegality check unit 104.

Also, a process flow chart for describing the program execution control apparatus of the second embodiment mode can be explained using the process flow chart for explained the program execution control apparatus of the first embodiment mode shown in FIG. 2. First, the condition detecting unit 103 detects the interrupt signal issued from the timer (step S201). In this case, the CPU 102 can cyclically generate the interrupt signal every predetermined time. A time interval between the interrupt signals can be exclusively determined to be, for example, 10 seconds at the time of execution.

Next, the illegality check unit 104 checks as to whether or not the program stored in the flash memory 101 is illegal (step S202).

Next, the illegality check unit 104 notifies the check result obtained in the step S202 to the execution control unit 105 (step S203). When the check result is notified as the normal value in step S203, the execution control unit 105 initiates the CPU 102 so as to execute the program (step S204). When the check result is notified as the illegal program in step S203, the execution control unit 105 performs such a control operation as stopping of the CPU 102, inhibiting of the CPU 102 from executing the program that is judged as the illegal program (step S205).

According to the program execution control apparatus and program execution control method of the second embodiment mode of the invention, as described above, even when the flash memory 101 is physically detachable and rewriting of the program stored in the flash memory 101 cannot be detected due to a method of replacement of the flash memory 101 with another flash memory 101 for storing an illegal program, execution of the illegal program can be prevented by checking as to whether or not the program stored in the flash memory is the illegal program when the interrupt signal is generated which is cyclically generated every predetermined time.

Third Embodiment Mode

Figure 3:
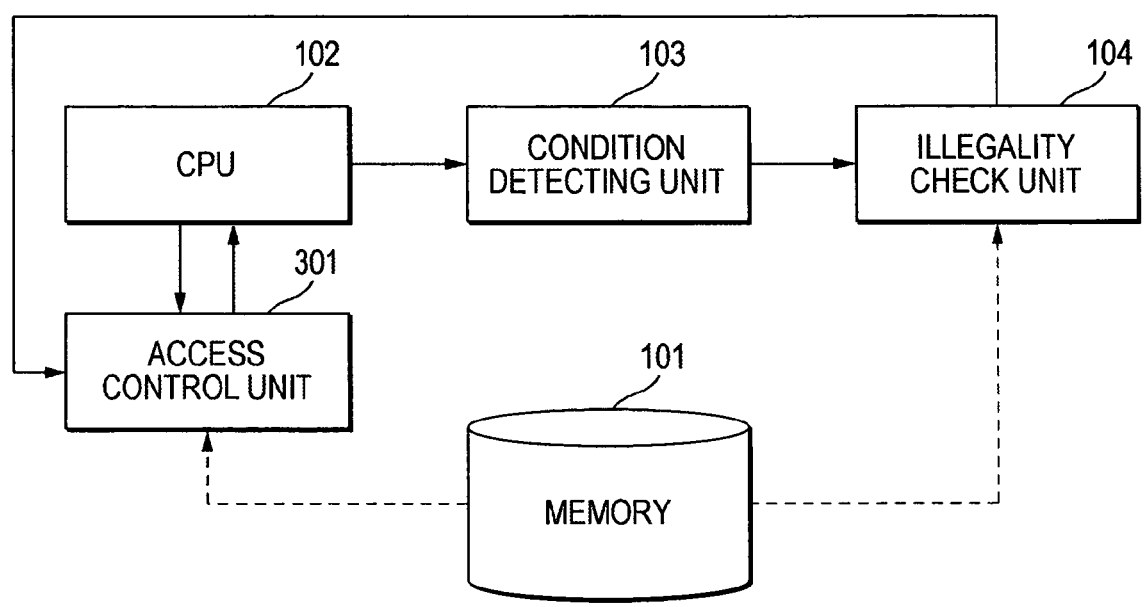
FIG. 3 is a structural diagram for showing program execution control apparatus according to third and fourth embodiment modes of the present invention.

FIG. 3 is an arrangement diagram for showing a program execution control apparatus according to a third embodiment mode of the invention. The program execution control apparatus is arranged by a flash memory 101 which stores thereinto a program to be executed, a CPU 102 which executes a program, a condition detecting unit 103 which detects that the flash memory 101 is reprogrammed by the CPU 102, an illegality check unit 104 which checks as to whether or not the program stored in the flash memory 101 is illegal when the condition detecting unit 103 detects the reprogramming, and an access control unit 301 which controls issuing of the program to the CPU 102 by referring to the result obtained from the illegality check unit 104 and an address of an instruction fetch by the CPU 102 in the flash memory 101.

Figure 4:
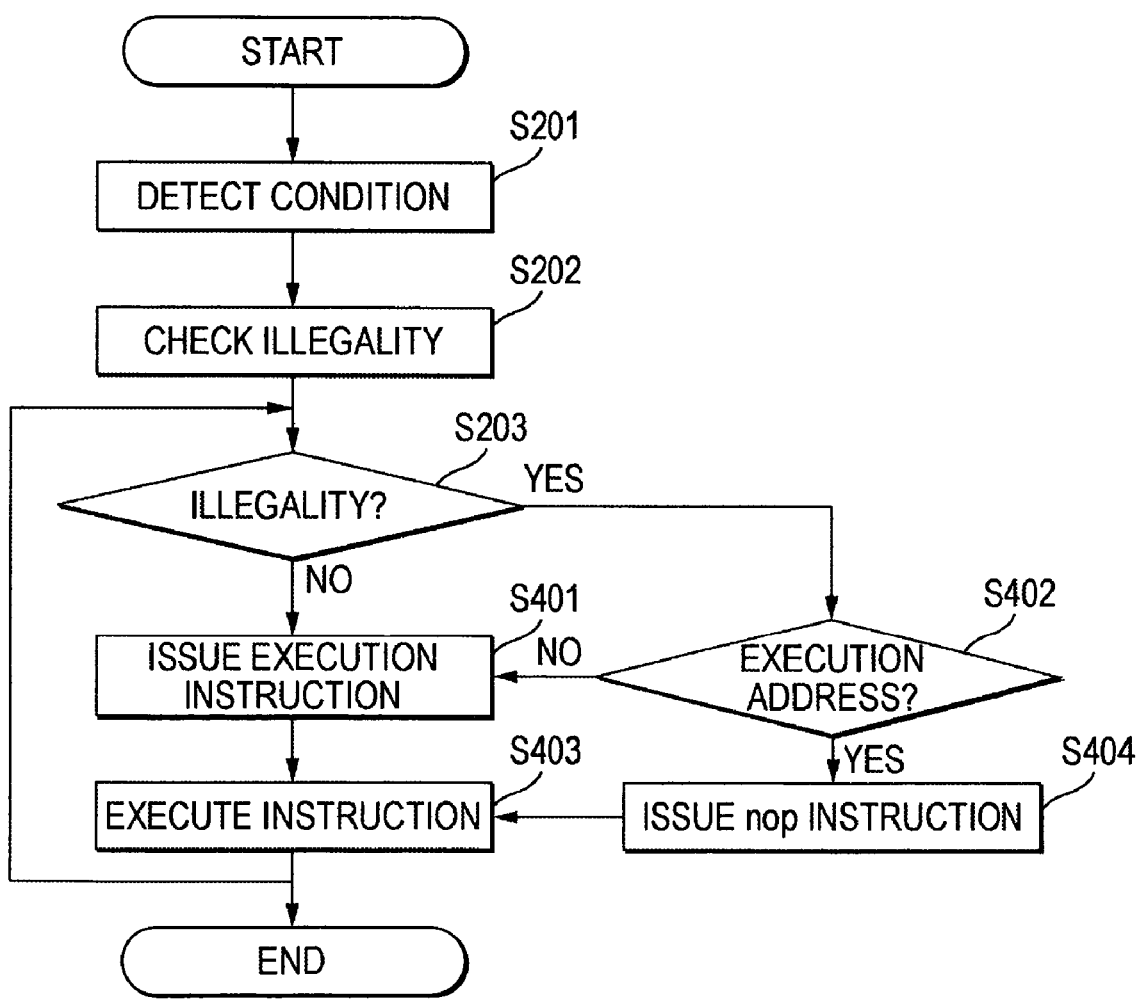
FIG. 4 is a process flow chart as to the program execution control apparatus according to the third and fourth embodiment modes of the present invention.

FIG. 4 is a process flow chart of the program execution control apparatus according to the third embodiment mode of the invention. First, the condition detecting unit 103 detects that the program stored in the flash memory 101 has been rewritten by the CPU 102 (step S201). As the method for the condition detecting unit 103 so as to detect rewriting of the program, a rewrite command is issued to the flash memory 101 by which completion of the rewriting process operation is detected in this third embodiment mode.

Next, the illegality check unit 104 checks as to whether or not the program rewritten in the flash memory 101 is illegal (step S202).

Next, the illegality check unit 104 notifies the check result obtained in the step S202 to the access control unit 301 of the check result in step S202 (step S203). When the check result is notified as the normal value in the step S203, the access control unit 301 acquires the program from the flash memory 101 and issues the program to the CPU 102 (step S401). When the check result is notified as the illegal program in the step S203, the access control unit 301 refers to the address of the instruction fetch by the CPU 102, and judges as to whether or not even the illegal program can be executed (step S402).

When the access control unit 301 judges in the step S402 that the program is executable, the access control unit 301 acquires the program from the flash memory 101 and issues the program to the CPU 102 (step S401). When the access control unit 301 judges in the step S402 that the program is not executable, the access control unit 301 issues to the CPU 102, an NOP instruction which causes the CPU 102 to execute nothing (step S404).

Next, the CPU 102 receives the instruction issued in the step S401 or the step S404, and executes the program or the NOP instruction (step S403).

The reason for branching the process operation to the step S401 or the step S404 by judging whether or not to execute even an illegal program by referring to the address of the instruction fetch is given as follows: That is, in case of operating a system which should always be initialized, for example, for an address at which an initialization program is stored, the program even if determined as the illegal program is to be executed, and for an address at which any other program is stored, the program even if determined as the illegal program is not executed. This ensures such a control operation as to allow operation of the initialization program which is not influenced at all or is influenced a little by illegality, but inhibit operation of any other program which is significantly influenced by illegality, even when the illegality check unit 104 judges the program as the illegal program, thus making it possible to control execution of programs smoothly and efficiently. Program execution can be efficiently controlled by allowing a program at an address in the internal memory to be executed even if this program is judged as the illegal program, and by inhibiting execution of a program at an address in an external memory if this program is an illegal program.

Further, program execution can be efficiently controlled by allowing execution of a program at a memory address in an area where no program can be rewritten and by inhibiting execution of an illegal program at a memory address in an area where a program can be rewritten.

Although the foregoing description has been given of an example where in the step S404, the access control unit 301 performs such a control operation as to send to the CPU 102, an NOP instruction to execute nothing, this example is not restrictive. For example, the access control unit 301 may issue an instruction to essentially stop the CPU 102 (stopping of clock or the like) or an instruction to cause the CPU 102 to execute a debug program, not a user program.

According to the program execution control apparatus and program execution control method of the third embodiment mode of the invention, as described above, every time the program stored in the flash memory is rewritten, the program is checked so as to ensure prevention of execution of this illegal program even if the program stored in the flash memory is rewritten to an illegal program. Program execution can be smoothly and efficiently controlled by performing such a control operation as to allow execution of a specific program such as a program which is not influenced at all or is influenced a little by illegality even if the program is rewritten to an illegal program.

Fourth Embodiment Mode

The arrangement of a program execution control apparatus according to a fourth embodiment mode is the same as the arrangement of the program execution control apparatus of the third embodiment shown in FIG. 3. The arrangement of the program execution control apparatus of the fourth embodiment mode differs from the third embodiment mode in that the condition detecting unit 103 detects an interrupt signal issued from a timer built in the CPU 102. The illegality check unit 104 and the access control unit 301 are arranged as follows: That is, when the condition detecting unit 103 detects the interrupt signal from the timer, the illegality check unit 104 checks as to whether or not the program stored in the flash memory 101 is illegal. The access control unit 301 controls issuing of a program to the CPU 102 by referring to the result obtained from the illegality check unit 104 and the address of the instruction fetch by the CPU 102 in the flash memory 101.

The process flow chart for describing the program execution control apparatus of the fourth embodiment mode can be explained using the process flow chart for the program execution control apparatus of the third embodiment mode shown in FIG. 4. First, the condition detecting unit 103 detects an interrupt signal issued from the timer (step S201). In this case, the CPU 102 can cyclically generate the interrupt signal every predetermined time. A time interval between the interrupt signals can be exclusively determined to be, for example, 10 seconds at the time of execution.

Next, the illegality check unit 104 checks as to whether or not the program rewritten in the flash memory 101 is illegal (step S202).

Next, the illegality check unit 104 notifies the check result obtained in the step S202 to the access control unit 301 (step S203). When the check result is notified as the normal value in the step S203, the access control unit 301 acquires the program from the flash memory 101 and issues the program to the CPU 102 (step S401). When the check result is notified as the illegal program in the step S203, the access control unit 301 refers to the address of the instruction fetch by the CPU 102, and judges as to whether or not even the illegal program can be executed (step S402).

When the access control unit 301 judges in the step S402 that the program is executable, the access control unit 301 acquires the program from the flash memory 101 and issues the program to the CPU 102 (step S401). When the access control unit 301 judges in the step S402 that the program is not executable, the access control unit 301 issues to the CPU 102, an NOP instruction which causes the CPU 102 to execute nothing (step S404).

Next, the CPU 102 receives the instruction issued in the step S401 or the step S404, and executes the program or the NOP instruction (step S403).

Since the reason for branching to the process operation to the step S401 or the step S404 by judging whether or not to execute even an illegal program by referring to the address of the instruction fetch is the same as that of the third embodiment mode, the description thereof is omitted.

According to the program execution control apparatus and program execution control method of the fourth embodiment mode of the present invention, as described above, even when the flash memory 101 is physically detachable and rewriting of the program stored in the flash memory 101 cannot be detected due to a method of replacement of the flash memory 101 with another flash memory 101 for storing thereinto an illegal program, execution of the illegal program can be prevented by checking as to whether or not the program stored in the flash memory is illegal when the interrupt signal is generated which is cyclically generated every predetermined time. Program execution can be smoothly and efficiently controlled by performing such a control operation as to allow execution of a specific program such as a program which is not influenced at all or is influenced a little by illegality even if the program is rewritten to an illegal program.

Fifth Embodiment Mode

Figure 5:
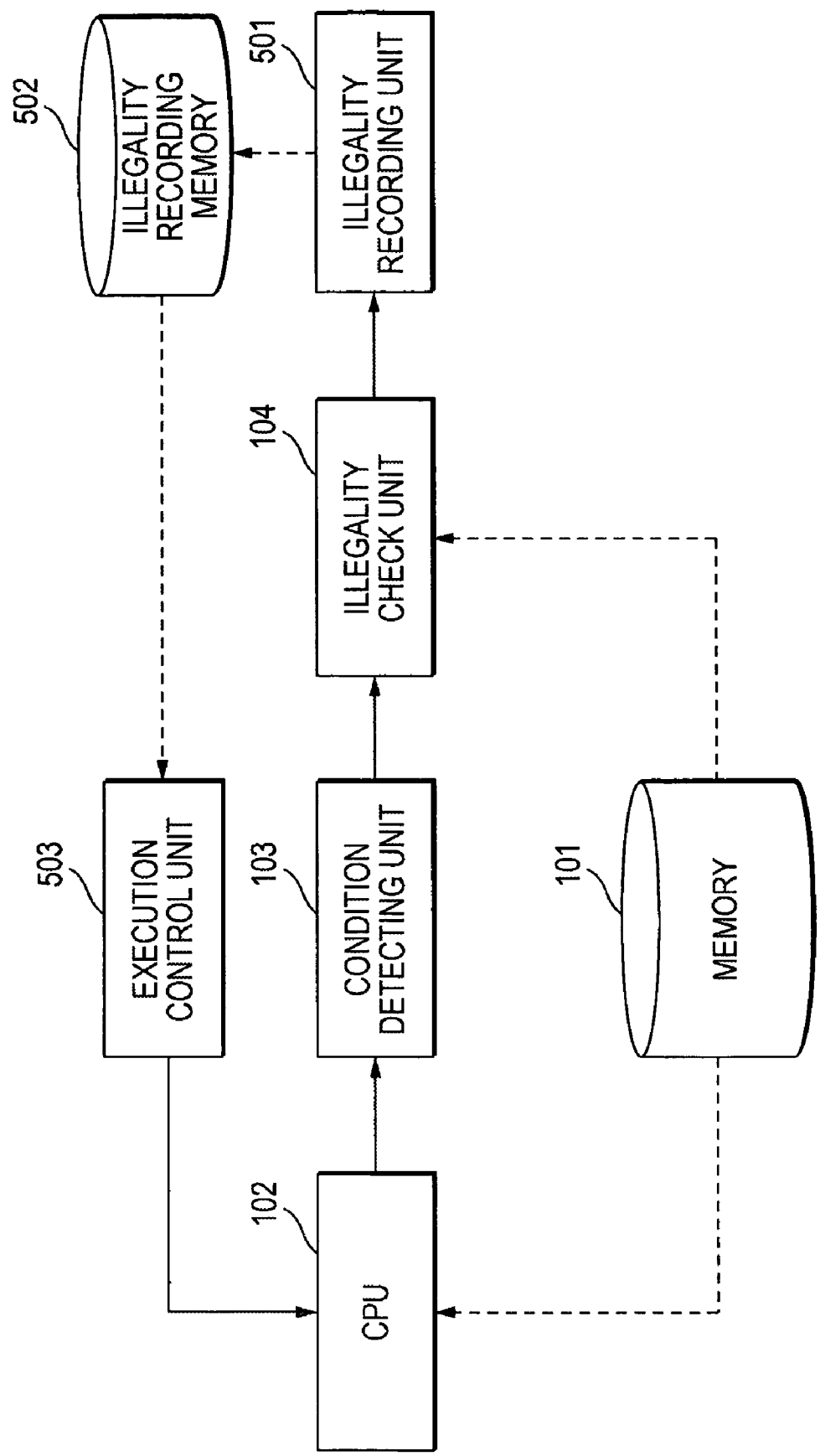
FIG. 5 is a structural diagram for showing program execution control apparatus according to fifth and sixth embodiment modes of the present invention.

FIG. 5 is an arrangement diagram for showing a program execution control apparatus according to a fifth embodiment mode of the invention. The program execution control apparatus is arranged by a flash memory 101 which stores thereinto a program to be executed, a CPU 102 which executes a program, a condition detecting unit 103 which detects that the flash memory 101 is reprogrammed by the CPU 102, an illegality check unit 104 which checks as to whether or not the program stored in the flash memory 101 is illegal when the condition detecting unit 103 detects the reprogramming, an illegality recording memory 502, an illegality recording unit 501 which records the result obtained from the illegality check unit 104 into the illegality recording memory 502, and an execution control unit 503 which controls execution of the program according to the result recorded in the illegality recording memory 502.

Figure 6:
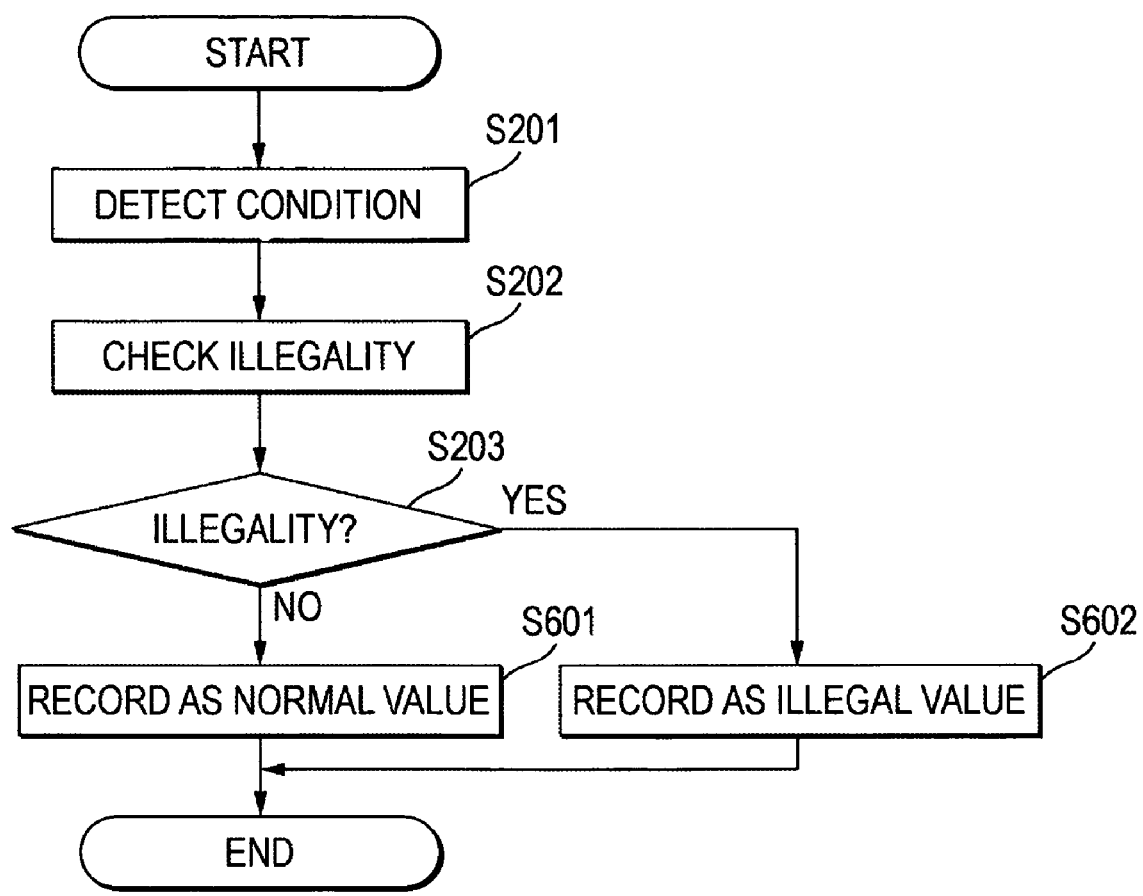
FIG. 6 is a process flow chart as to the program execution control apparatus according to the fifth, sixth, seventh, and eighth embodiment modes of the present invention.
Figure 7:
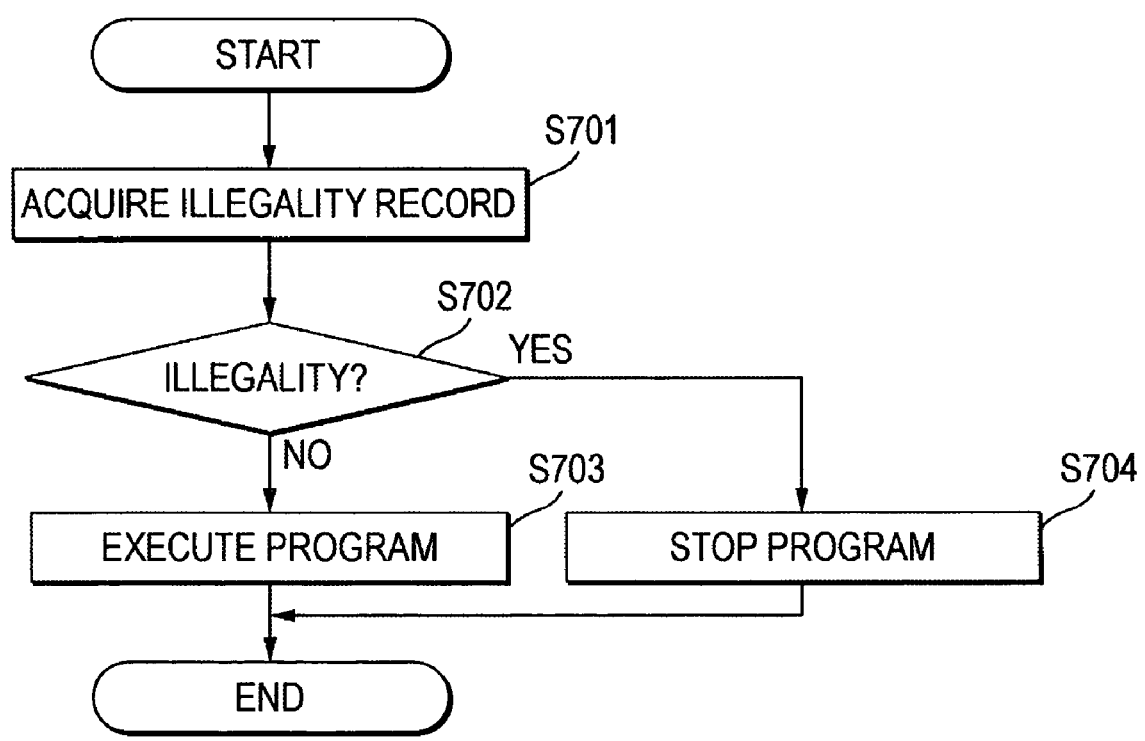
FIG. 7 is a process flow chart as to the program execution control apparatus according to the fifth and sixth embodiment modes of the present invention.

FIGS. 6 and 7 are process flow charts for describing the program execution control apparatus according to the fifth embodiment mode of the present invention.

FIG. 6 is a flow chart for illustrating process operations up to recording of the result obtained from the illegality check unit 104 by the program execution control apparatus according to the fifth embodiment mode of the invention. In FIG. 6, firstly, the condition detecting unit 103 detects that the program stored in the flash memory 101 has been rewritten by the CPU 102 (step S201). In the fifth embodiment, the condition detecting unit 103 detects that a rewrite command is issued to the flash memory 101, and the rewrite process operation is completed.

Next, the illegality check unit 104 checks as to whether or not the program rewritten in the flash memory 101 is illegal (step S202).

Next, the illegality check unit 104 notifies the check result obtained in the step S202 to the illegality recording unit 501 (step S203). When the check result is notified as normal value in the step S203, the illegality recording unit 501 records a normal value in the illegality recording memory 502 (step S601). When the check result is notified as an illegal value in the step S203, the illegality recording unit 501 records the illegal value in the illegality recording memory 502 (step S602). In this case, the normal value is 1, and the illegal value is 0.

FIG. 7 is a process flow chart for explaining the program execution control apparatus according to the fifth embodiment mode of the present invention. When a program is executed which has already undergone an illegality check, the execution control unit 503 acquires the check result prerecorded in the illegality recording memory 502 (step S701). Then, the illegality checking unit 104 judges as to whether the acquired check result is a normal value, or an illegal value (step S702).

When the check result is the normal value of 1, the execution control unit 503 initiates the CPU 102 so as to execute the program (step S703). When the check result is the illegal value of 0, the execution control unit 503 performs such a control operation as stopping of the CPU 102 so as to inhibit the CPU 102 from executing the program that is judged as the illegal program (step S704).

According to the program execution control apparatus and program execution control method of the fifth embodiment mode of the present invention, as described above, every time the program stored in the flash memory is rewritten, the program is checked so as to ensure prevention of execution of an illegal program even if the program stored in the flash memory is rewritten to an illegal program. Prerecording of the check result ensures easy confirmation of an illegal program and the time instant when the illegal program is stored. Controlling of execution of a program according to the recorded check result can eliminate the need to control whether or not a program is executed every time the presence/absence of an illegal program is checked. This makes it possible to smoothly and efficiently control the execution of the program.

Sixth Embodiment Mode

An arrangement of a program execution control apparatus according to a sixth embodiment mode is the same as the arrangement of the program execution control apparatus of the fifth embodiment mode. The arrangement of the program execution control apparatus of the sixth embodiment differs from the fifth embodiment in that the condition detecting unit 103 detects an interrupt signal produced from a timer built in the CPU 102. The illegality check unit 104, the illegality recording unit 501, and the execution control unit 503 are arranged as follows: That is, when the condition detecting unit 103 detects the interrupt signal from the timer, the illegality check unit 104 checks as to whether or not the program stored in the flash memory 101 is illegal. The illegality recording unit 501 records the result obtained from the illegality check unit 104 into the illegality recording memory 502. The execution control unit 503 controls execution of a program in accordance with the result recorded in the illegality recording memory 502.

FIGS. 6 and 7 are process flow charts for describing the program execution control apparatus according to the sixth embodiment mode of the invention.

FIG. 6 is a flow chart for describing process operations up to recording of the result obtained from the illegality check unit 104 by the program execution control apparatus according to the sixth embodiment mode of the present invention. In FIG. 6, firstly, the condition detecting unit 103 detects an interrupt signal produced from the timer (step S201). In this case, the CPU 102 can cyclically generate the interrupt signal every predetermined time. A time interval between the interrupt signals can be exclusively determined to be, for example, 10 seconds at the time of execution.

Next, the illegality check unit 104 checks as to whether or not the program rewritten in the flash memory 101 is illegal (step S202).

Next, the illegality check unit 104 notifies the check result obtained in the step S202 to the illegality recording unit 501 (step S203). When the check result is notified as the normal value in the step S203, the illegality recording unit 501 records this normal value in the illegality recording memory 502 (step S601). When the check result is notified as the illegal value in the step S203, the illegality recording unit 501 records this illegal value in the illegality recording memory 502 (step S602). In this case, the normal value is 1, and the illegal value is 0.

FIG. 7 is a process flow chart for explaining the program execution control apparatus according to the sixth embodiment mode of the present invention. When a program is executed which has already undergone an illegality check, the execution control unit 503 acquires the check result prerecorded in the illegality recording memory 502 (step S701). Then, the illegality check unit 104 judges as to whether the acquired check result is a normal value, or an illegal value (step S702).

When the check result is the normal value of 1, the execution control unit 503 initiates the CPU 102 so as to execute the program (step S703). When the check result is the illegal value of 0, the execution control unit 503 performs such a control operation as stopping of the CPU 102 so as to inhibit the CPU 102 from executing the program that is judged as the illegal program (step S704).

According to the program execution control apparatus and program execution control method of the fourth embodiment mode of the invention, as described above, even when the flash memory 101 is physically detachable and rewriting of the program stored in the flash memory 101 cannot be detected due to such a method of replacement of the flash memory 101 with another flash memory 101 for storing an illegal program, execution of the illegal program can be prevented by checking as to whether or not the program stored in the flash memory is illegal when the interrupt signal is generated which is cyclically generated every predetermined time. Prerecording of the check result ensures easy confirmation of an illegal program and the time instant when the illegal program is stored. Controlling of execution of a program according to the recorded check result can eliminate the need to control whether or not a program is executed every time the presence/absence of an illegal program is checked. This makes it possible to smoothly and efficiently control program execution.

Seventh Embodiment Mode

Figure 8:
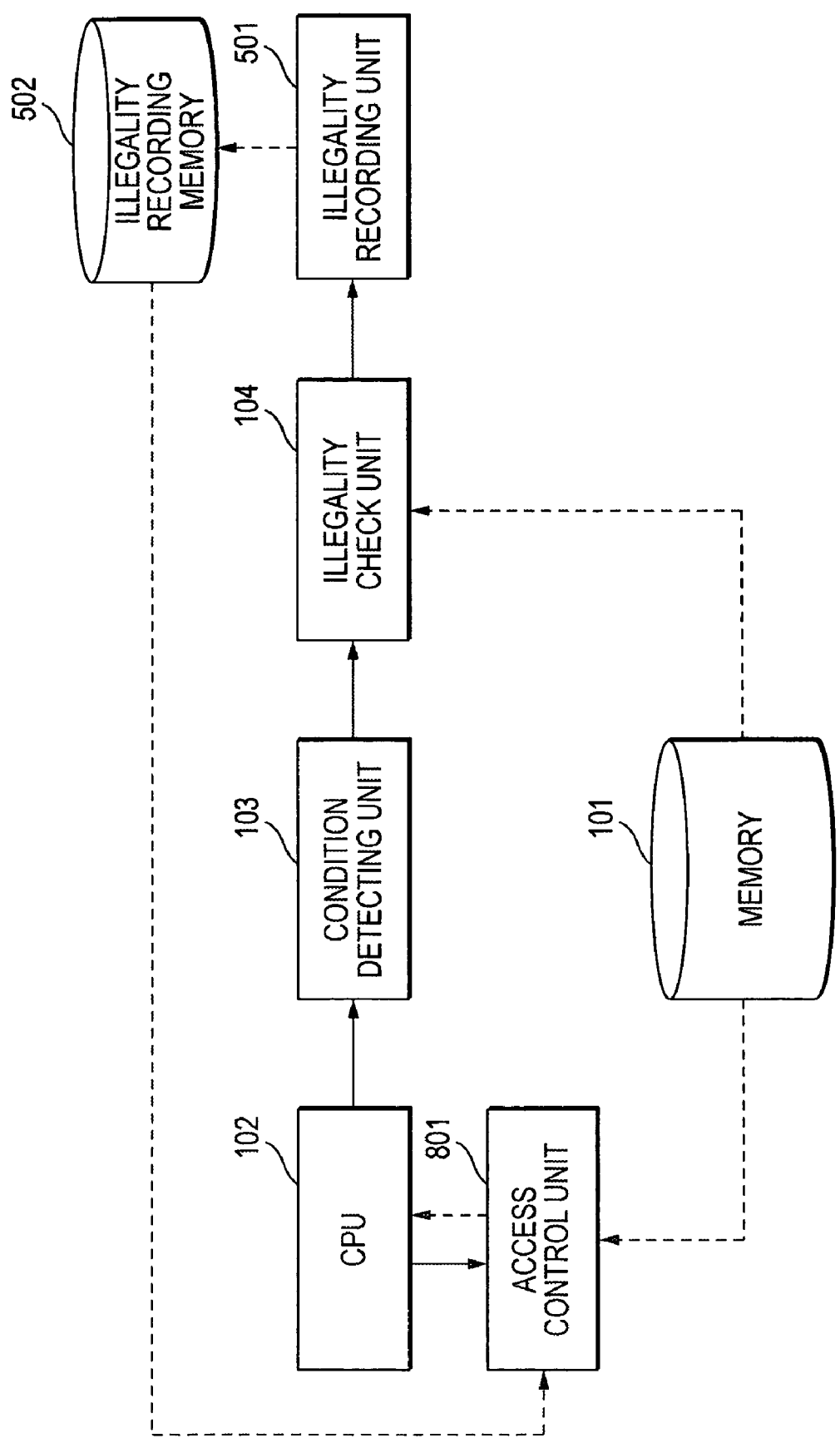
FIG. 8 is a structural diagram for showing program execution control apparatus according to seventh and eighth embodiment modes of the present invention.

FIG. 8 is an arrangement diagram for showing a program execution control apparatus according to a seventh embodiment mode of the present invention. The program execution control apparatus is arranged by a flash memory 101 which stores thereinto a program to be executed, a CPU 102 which executes a program, a condition detecting unit 103 which detects that the flash memory 101 is reprogrammed by the CPU 102, an illegality check unit 104 which checks as to whether or not the program stored in the flash memory 101 is illegal when the condition detecting unit 103 detects the reprogramming, an illegality recording memory 502, an illegality recording unit 501 which records the result obtained from the illegality check unit 104 into the illegality recording memory 502, an access control unit 801 which controls issuing of the program to the CPU 102 by referring to the result recorded in the illegality recording memory 502 and an address of an instruction fetch by the CPU 102 in the flash memory 101.

Figure 9:
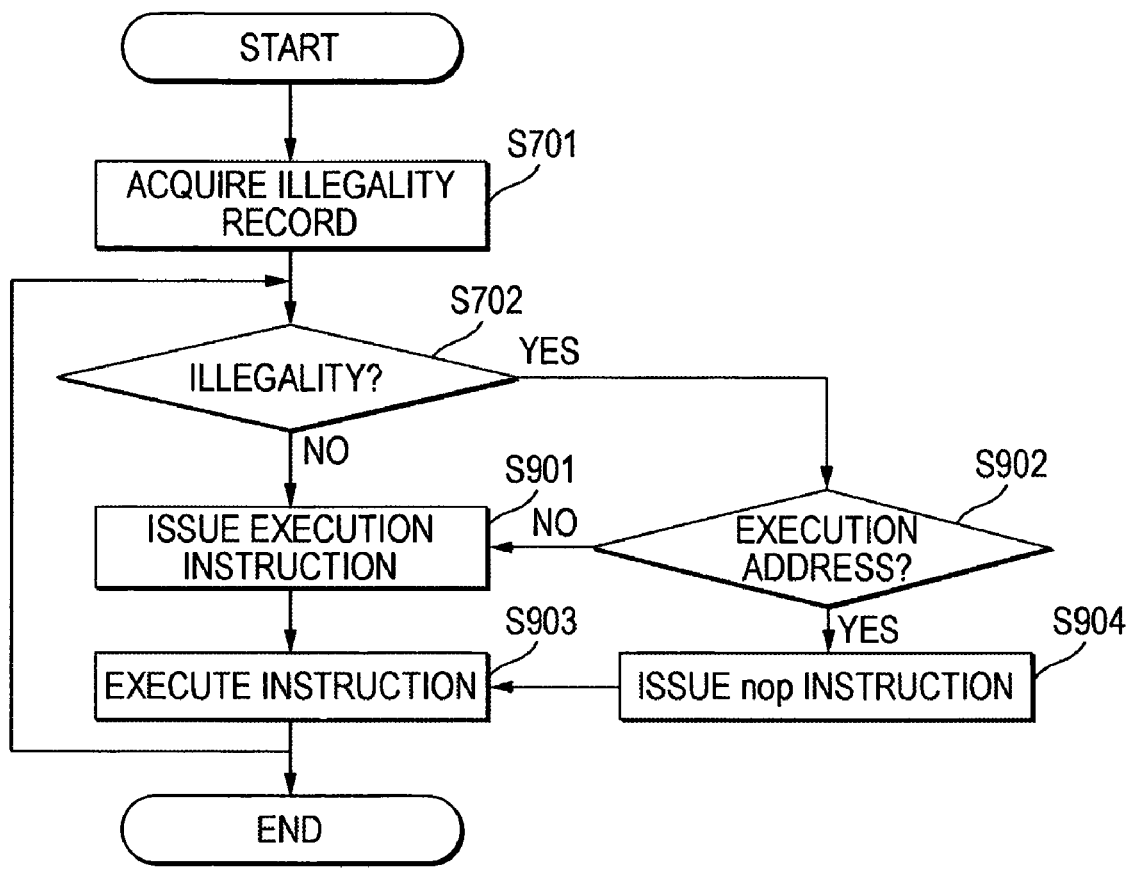
FIG. 9 is a process flow chart as to the program execution control apparatus according to the seventh and eighth embodiment modes of the present invention.

FIG. 9 is a process flow chart for describing the program execution control apparatus according to the seventh embodiment mode of the present invention. Since the process flow operations up to recording of the result from the illegality check unit 104 into the illegality recording memory 502 is the same as that of the fifth embodiment mode, the description thereof will be omitted, and a process operation for controlling execution of a program will be explained with reference to FIG. 9.

When a program is executed which has already undergone an illegality check, the access control unit 801 acquires the check result prerecorded in the illegality recording memory 502 (step S701). Then, the access control unit 801 judges as to whether the acquired check result is a normal value, or an illegal value (step S702).

When the check result is the normal value of 1, the access control unit 801 acquires a program from the flash memory 101 and issues the program to the CPU 102 (step S901). When the check result is the illegal value of 0 in step S702, the access control unit 801 judges as to whether or not even the illegal program can be executed by referring to an address of an instruction fetch by the CPU 102 (step S902).

When the access controller 801 judges in the step S902 that the program is executable, the access control unit 801 acquires the program from the flash memory 101 and issues the program to the CPU 102 (step S901). When the access controller 801 judges in the step S902 that the program is not executable, the access control unit 801 issues to the CPU 102, an NOP instruction which causes the CPU 102 to execute nothing (step S904).

Next, the CPU 102 receives the instruction issued in the step S901 or the step S904, and executes either the program or the NOP instruction (step S903).

Since the reason for branching the process operation to step S901 or step S904 by determining as to whether or not to execute even an illegal program by referring to the address of the instruction fetch is the same as that of the third embodiment mode, the description thereof will be omitted.

According to the program execution control apparatus and program execution control method of the seventh embodiment mode of the present invention, as described above, every time the program stored in the flash memory is rewritten, the program is checked so as to ensure prevention of execution of an illegal program even if the program stored in the flash memory is rewritten to the illegal program. Prerecording of the check result ensures easy confirmation of an illegal program and the time instant when the illegal program is stored. Controlling of execution of a program according to the recorded check result can smoothly and efficiently control execution of a program. Program execution can be smoothly and efficiently controlled by performing such a control operation as to allow execution of a specific program such as a program which is not influenced at all or is influenced a little by illegality even if the program is rewritten to an illegal program.

Eighth Embodiment Mode

An arrangement of a program execution control apparatus according to an eighth embodiment mode is the same as the arrangement of the program execution control apparatus of the seventh embodiment mode shown in FIG. 8. The arrangement of the program execution control apparatus of the eighth embodiment mode differs from the seventh embodiment mode in that the condition detecting unit 103 detects an interrupt signal issued from a timer built in the CPU 102. The illegality check unit 104, the illegality recording unit 501, and the access control unit 801 are arranged as follows: That is, when the condition detecting unit 103 detects the interrupt signal from the timer, the illegality check unit 104 checks as to whether or not the program stored in the flash memory 101 is illegal. Then, the illegality recording unit 501 records a result obtained from the illegality check unit 104 into the illegality recording memory 502. The access control unit 801 controls issuing of the program to the CPU 102 by referring to the result recorded in the illegality recording memory 502 and an address of an instruction fetch by the CPU 102 in the flash memory 101.

Since the process flow operations up to recording of the result obtained from the illegality check unit 104 into the illegality recording memory 502 is the same as that of the sixth embodiment, the description thereof will be omitted. As the process flow operation for controlling execution of a program is the same as that of the seventh embodiment, the description thereof will be omitted.

According to the program execution control apparatus and program execution control method of the eighth embodiment mode of the present invention, as described above, even when the flash memory 101 is physically detachable and rewriting of the program stored in the flash memory 101 cannot be detected due to such a method of replacement of the above-explained flash memory 101 with another flash memory 101 for storing thereinto an illegal program, execution of the illegal program can be prevented by checking as to whether or not the program stored in the flash memory is illegal when the interrupt signal is generated which is cyclically generated every predetermined. Prerecording of the check result ensures easy confirmation of an illegal program and the time instant when the illegal program is stored. Controlling of execution of a program according to the recorded check result makes it possible to smoothly and efficiently control program execution. Program execution can be smoothly and efficiently controlled by performing such a control operation as to allow execution of a specific program such as a program which is not influenced at all or is influenced a little by illegality even if the program is rewritten to an illegal program.

Although the above-explained descriptions of the first to eighth embodiment modes have been given as such a limited example where the memory which stores a program to be executed is limited to the flash memory 101, the above-explained memory can be realized by employing any type of memory which stores a program.

Although the descriptions of the first to eighth embodiment modes have been given as such a limited example where the condition for the condition detecting unit 103 is limited to the time when the content of the flash memory 101 is rewritten by the CPU 102 or the time at which an interruption signal is generated by the built-in timer of the CPU 102, the condition to be detected may be defined by the time of an occurrence of rewriting operation which is carried out by DMA or external control operation without using the CPU 102, or the time instant when an exclusive instruction in a program is executed. A plurality of conditions such as a timing of 10 seconds after an initialization process operation is terminated and the timing of 30 seconds after an entire system starts to be operated may be set, and the check may be performed at each of the timings that can satisfy the conditions.

Although the present invention has been explained in detail or referring to specific embodiments, it is obvious for those skilled in the art that various modifications and changes may be made without departing from the spirit and scope of the present invention.

This application is made based on the Japanese patent application (JP-A-2004-146395) filed on May 17, 2004, which is incorporated herein by reference.

INDUSTRIAL APPLICABILITY

Since the program execution control apparatus and the program execution control method according to the present invention check the presence/absence of illegality in the program at any check timing, it is possible to find out an illegal program without overlooking such an illegal program and prevent execution of the illegal program. After a program is rewritten to an illegal program, the rewritten illegal program is checked and the check result is recorded, so that it is possible to check that which program is rewritten illegally at which timing. When a system fault occurs which is caused by that an illegal program is stored in the memory and then is executed, it is easy to specify the cause for the system fault, which is useful in the software development field of a devices-installed system.

The invention claimed is:

1. A program execution control apparatus comprising:
a memory interface for storing thereinto a program;
a detection unit configured to detect a check time instant for checking whether or not said program is illegal;
a check unit configured to check whether or not illegality is present in said program at said check time instant;
a control unit configured to control to execute a program having no illegality, which is judged by said check unit;
an execution unit for executing said program having no illegality; and
a judging unit configured to judge, when the check unit determined that said program has illegality, that said program having the illegality is executed if an address of an instruction fetch corresponds to an address for which said program having illegality is executable despite of the illegality and that said program having the illegality is not executed if the address of an instruction fetch corresponds to an address for which said program having illegality is not executable due to the illegality, wherein:
said control unit controls to execute said program having the illegality, which is judged to be executed, and
the illegality is detected when a value resulting from a summation of data of the program is different from a predetermined normal value.

2. The program execution control apparatus as claimed in claim 1, wherein:
said detection unit detects a predetermined time instant.

3. The program execution control apparatus as claimed in claim 1, wherein:
said detection unit detects a time instant when said program is rewritten.

4. The program execution control apparatus as claimed in claim 1, wherein:
said detection unit detects a time instant for every predetermined time interval.

5. The program execution control apparatus as claimed claim 1, further comprising
a recording unit configured to record a check result checked by said check unit.

6. The program execution control apparatus as claimed in claim 5, wherein:
said control unit controls so that said program having no illegality is executed by referring to the check result recorded in said recording unit.

7. A program execution control method comprising:
a detection step for detecting, by a detection unit, a check time instant for checking whether or not a program stored in a memory interface is illegal;
a check step for checking, by a check unit, whether or not illegality is present in said program at said check time instant;
a control step for controlling, by a control unit, to execute a program having no illegality, which is judged by said check step;
an execution step for executing, by a CPU, said program having no illegality; and
a judging step for judging, when it is determined that the illegality is present in said program, that said program having the illegality is executed if an address of an instruction fetch corresponds to an address for which said program having illegality is executable despite of the illegality and that said program having the illegality is not executed if the address of an instruction fetch corresponds to an address for which said program having illegality is not executable due to the illegality, wherein:
said control step controls to execute said program having the illegality, which is judged to be executed, and
the illegality is detected when a value resulting from a summation of data of the program is different from a predetermined normal value.

8. The program execution control method as claimed in claim 7, wherein:
said detection step detects a predetermined time instant.

9. The program execution control method as claimed in claim 7, wherein:

said detection step detects a time instant when said program is rewritten.

10. The program execution control method as claimed in claim 7, wherein:

said detection step detects a time instant for every predetermined time interval.

11. The program execution control method as claimed in claim 7, further comprising:

a recording step for recording a check result checked by said check step.

12. The program execution control method as claimed in claim 11, wherein:

said control step controls that said program having no illegality is executed by referring to the recorded check result.

13. The program execution control apparatus as claimed in claim 1, wherein the address for which said program having illegality is executable despite of the illegality is an address that the illegality does not influence execution of said program from the address.

14. The program execution control method as claimed in claim 7, wherein the address for which said program having illegality is executable despite of the illegality is an address that the illegality does not influence execution of said program from the address.

* * * * *